United States Patent [19]

Markusch et al.

[11] Patent Number: 5,389,720
[45] Date of Patent: Feb. 14, 1995

[54] AQUEOUS POLYISOCYANATE DISPERSIONS

[75] Inventors: Peter H. Markusch, McMurray, Pa.; Ashok M. Sarpeshkar, New Martinsville, W. Va.

[73] Assignee: Miles Inc., Pittsburgh, Pa.

[21] Appl. No.: 529,056

[22] Filed: May 25, 1990

[51] Int. Cl.⁶ ............................................. C08G 18/08
[52] U.S. Cl. ..................................... 524/839; 528/49; 428/290
[58] Field of Search ........................... 528/49; 524/839

[56] References Cited

U.S. PATENT DOCUMENTS

| | | | |
|---|---|---|---|
| 3,905,929 | 9/1975 | Noll | 528/49 |
| 4,011,311 | 3/1977 | Noomen et al. | 524/839 |
| 4,535,111 | 8/1985 | Perrey et al. | 524/199 |
| 4,904,522 | 2/1990 | Markusch | 428/288 |
| 5,043,098 | 8/1991 | Padget et al. | 252/357 |

FOREIGN PATENT DOCUMENTS

| | | |
|---|---|---|
| 0260430 | 3/1988 | European Pat. Off. |
| 0279198 | 8/1988 | European Pat. Off. |
| 1362674 | 8/1974 | United Kingdom |

OTHER PUBLICATIONS

Chemical Abstracts, vol. 78, No. 8, Feb. 1973, Abst. No. 44663h entitled "Polyurethane Latexes", (Toyo Rubber).

*Primary Examiner*—George F. Lesmes
*Assistant Examiner*—C. Raimund
*Attorney, Agent, or Firm*—Joseph C. Gil; N. Denise Brown; Richard E. L. Henderson

[57] ABSTRACT

The present invention is directed to an aqueous polyisocyanate dispersion which has an isocyanate content of at least 0.5% by weight, based on the weight of the polyisocyanate, and is prepared by a) dispersing in water a polyisocyanate which has an isocyanate content of at least 12% by weight and is rendered hydrophilic by reaction with a compound containing a lateral or terminal nonionic hydrophilic group and b) chain extending the dispersed polyisocyanate with a primary or secondary monoamine containing at least one hydroxyl group in an amount sufficient to provide an equivalent ratio of amino groups to isocyanate groups of 0.6:1.0 to 0.95:1.0.

4 Claims, No Drawings

AQUEOUS POLYISOCYANATE DISPERSIONS

BACKGROUND OF THE INVENTION

1. Field of the Invention

The present invention is directed to improved aqueous polyisocyanate dispersions having a low isocyanate content and to their use as binders for fibers, especially fiberglass.

2. Description of the Prior Art

It is known from U.S. Pat. No. 4,904,522 to use aqueous dispersions of polyisocyanates as binders for fiberglass. When compared to known phenol/formaldehyde resins, the polyisocyanate binders cure at a much lower temperature, do not split off volatile monomers, provide at least the same strength, are not a potential formaldehyde source and do not require an amino alkoxy silane adhesion promoter. However, the polyisocyanate binders disclosed in the copending application have relatively high quantities of unmodified monomeric diisocyanates. Because the presence of monomeric diisocyanates may lead to industrial hygiene problems, it would be beneficial to reduce the content of monomeric diisocyanates as much as possible.

Another deficiency of the polyisocyanate binders disclosed in U.S. Pat. No. 4,904,522 is that it is difficult to achieve complete cure during subsequent heating of the fiberglass mats in the oven zone. During the production of fiberglass mats, the fibers are treated with the aqueous polyisocyanate binders and continuously run through an oven zone in order to evaporate water and to cure the polyisocyanate resins.

When aqueously dispersed polyisocyanates are used as binders, the water serves as the co-reactant for the isocyanate groups to form polyureas. If the isocyanate content of the polyisocyanate binder is too high, water is evaporated in the oven zone before the reaction is complete and as a result, an uncured, unusable fiberglass mat is obtained.

A further disadvantage is that even though the preferred polyisocyanates of U.S. Pat. No. 4,904,522, i.e., polyphenyl polymethylene polyisocyanates, exhibit a low vapor pressure at ambient temperature, they still contain high amounts (as much as 70% by weight) of monomeric diphenyl methane diisocyanates. Upon exposure to the high temperatures in the oven zone these monomeric diisocyanates can be volatilized which results in high concentrations in the exhaust gases. This represents an environmental hazard if these exhaust gases escape into the atmosphere of the workplace or the air surrounding the manufacturing facility.

One method for lowering the isocyanate content of the polyisocyanate binders would be to react the polyisocyanates with polyols to form isocyanate-terminated prepolymers prior to dispersing in water. However, this results in products which have high viscosities at the desired low isocyanate content, i.e., an isocyanate content of less than 10% by weight, based on solids, and thus are too viscous to disperse in water even if they have been hydrophilically modified. Another method of avoiding uncured polyisocyanate binders is to incorporate catalysts which promote the isocyanate/water reaction in the aqueously dispersed polyisocyanate binders. However, this method also does not result in a complete cure of the polyisocyanate prior to evaporation of water in the oven zone.

Accordingly, it is an object of the present invention to provide aqueously dispersed polyisocyanate binders which have low isocyanate contents and do not possess any of the deficiencies of the previously described binders. It is an additional object to provide aqueously dispersed polyisocyanate binders which need only small amounts of water to cure and which develop their final properties much more rapidly under the given conditions. It is a further object of the present invention to provide aqueously dispersed polyisocyanates that despite their low isocyanate contents still exhibit film forming properties and excellent adhesion to the fibers. Finally, it is an object of the present invention to provide aqueously dispersed polyisocyanate binders which have the advantage of containing small amounts of volatile monomeric diisocyanates.

These objects may be achieved in accordance with the present invention as described hereinafter.

SUMMARY OF THE INVENTION

The present invention is directed to an aqueous polyisocyanate dispersion which has an isocyanate content of at least 0.5% by weight, based on the weight of the polyisocyanate, and is prepared by
  a) dispersing in water a polyisocyanate which has an isocyanate content of at least 12% by weight and
  b) chain extending the dispersed polyisocyanate with a primary or secondary monoamine containing at least one hydroxyl group in an amount sufficient to provide an equivalent ratio of amino groups to isocyanate groups of 0.6:1.0 to 0.95:1.0.

The present invention is also directed to a process for the preparation of a fibrous mat by
  a) dispersing in water a polyisocyanate which has an isocyanate content of at least 12% by weight,
  b) chain extending the dispersed polyisocyanate with a primary or secondary monoamine containing at least one hydroxyl group in an amount sufficient to provide an equivalent ratio of amino groups to isocyanate groups of 0.6:1.0 to 0.95:1.0 and
  c) subsequently treating fibers with the dispersed polyisocyanate before the isocyanate content of the dispersed polyisocyanate is less than 0.5% by weight, based on the weight of the polyisocyanate.

Finally, the present invention is also directed to the fibrous mats obtained in accordance with this process.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable isocyanates include 1,6-hexamethylene diisocyanate, 1,12-dodecane diisocyanate, cyclobutane-1,3-diisocyanate, cyclohexane-1,3- and/or -1,4-diisocyanate, 1-isocyanato-3,3,5-trimethyl-5- isocyanatomethyl cyclohexane, 2,4-and/or 2,6-hexahydrotoluylene diisocyanate, hexahydro-1,3- and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4', 4"-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, urethane groups or biuret groups, especially those based on 2,4- and/or 2,6-toluylene diisocyanate ("TDI").

The polyisocyanates or polyisocyanate adducts used to prepare the aqueous dispersions of the present invention may be used in their unmodified, hydrophobic form or they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 20% by weight, preferably about 0.5 to 10% by weight, more preferably about 1 to 6% by weight and most preferably about 2 to 6% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

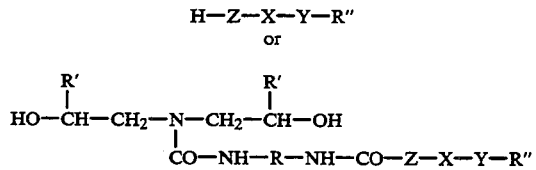

wherein

R represents a difunctional radical obtained by removing the isocyanate groups from a diisocyanate corresponding to those previously set forth, R' represents hydrogen or a monovalent hydrocarbon radical containing from 1 to 8 carbon atoms, preferably hydrogen or a methyl group, R" represents a monovalent hydrocarbon radical having from 1 to 12 carbon atoms, preferably an unsubstituted alkyl radical having from 1 to 4 carbon atoms, X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units, Y represents oxygen or —NR'"— wherein R'" has the same definition as R" and Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

After the polyisocyanates have been dispersed in water, they are chain extended with primary or secondary monoamines containing one or two hydroxy groups. Suitable compounds are those which correspond to the formula

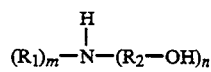

$$(R_1)_m\text{—}\underset{\underset{H}{|}}{N}\text{—}(R_2\text{—}OH)_n$$

wherein $R_1$ represents hydrogen or an alkyl, cycloalkyl, araliphatic or aromatic group having up to 15 carbon atoms, preferably an alkyl group containing 1 to 6 carbon atoms, $R_2$ is an optionally branched alkylene group containing 1 to 12, preferably 1 to 4 carbon atoms, m represents 0 or 1, n represents 1 or 2 and $m+n=2$.

Examples of suitable compounds include ethanolamine, propanolamine, butanolamine, N-methyl-ethanolamine, N-ethyl-ethanolamine, N-propyl-ethanolamine, N-butyl-ethanolamine, N-methyl-propanolamine, N-ethyl-propanolamine, N-propyl-propanolamine, N-butyl-propanolamine, N-methyl-butanolamine, N-ethyl-butanolamine, N-propyl-butanolamine, N-butyl-butanolamine, diethanolamine, dipropanolamine, dibutanolamine, and N-ethanol-N-propanolamine. Ethanolamine is especially preferred.

The chain extender may be added to the water either before, during or after the polyisocyanate has been dispersed. Preferably, the polyisocyanate is first dispersed in water and then the amine/hydroxy compound is added to the dispersed polyisocyanate. The amount of the amine/hydroxy compound which is added is chosen to provide an equivalent ratio of amino groups of the amino/hydroxy compound to isocyanate groups of the polyisocyanate of 0.6:1.0 to 0.95:1.0, preferably 0.8:1.0 to 0.95:1.0. At this equivalent ratio of amino groups to isocyanate groups, there are always more than enough pendant OH groups present to react with the remaining isocyanate groups and complete the cure. However, it cannot be excluded that a certain amount of the remaining isocyanate groups may react with water. If sufficient isocyanate groups are not reacted during the chain extension step, then all of the unreacted isocyanate groups may not cure prior to vaporization of the water in the oven zone as previously discussed.

It is also important not to react all of the isocyanate groups prior to applying the low NCO content polyisocyanate dispersions to the fibers. If all of the isocyanate groups have been reacted prior to this step, then the polyisocyanate is no longer film forming and will not adequately bind the fibers. Accordingly, prior to spraying the polyisocyanate dispersion onto the fibers, the NCO content should be at least 0.5%, preferably at least 1.0% by weight, based on the weight of the chain extended polyisocyanate.

Accordingly, if the polyisocyanate dispersion is to be applied to the fibers immediately after the addition of the chain extender, i.e., within 10 to 20 minutes, then the upper limit of chain extender to be added is an amount sufficient to provide an equivalent ratio of amino groups to isocyanate groups of about 0.95:1.0. This is because the hydroxyl groups will not have sufficient time to react with the isocyanate groups before the dispersed polyisocyanate is applied to the fibers, thus ensuring a sufficient NCO content to provide a film-forming polyisocyanate. To the contrary, if it will be more than 20 minutes after the addition of the chain extender before the polyisocyanate dispersion is to be applied to the fibers, then lesser amounts of the chain extender should be used so that the isocyanate content will be at least 0.5% by weight as previously discussed. It is preferred to apply the dispersed polyisocyanate to the fibers within 10 to 20 minutes after the addition of the chain extender.

Suitable fibers for use in accordance with the present invention include fiberglass, wood fibers, carbon fibers and synthetic organic fibers such as polyamide fibers. Fiberglass is especially preferred.

In a preferred embodiment of the present invention fiberglass mats are prepared by spraying the fibers with the aqueous polyisocyanates, which are generally applied to the glass directly below the spinner in which very hot liquid glass is converted into fibers. The aqueous polyisocyanate is then cured by passing through an oven in known manner.

The polyisocyanate dispersion having a low NCO content obtained after the chain extension step is generally applied to the the fibers at a viscosity of about 5 to 5000, preferably 20 to 1000 mPa.s. Since the low NCO content polyisocyanate dispersions are preferably applied to the fibers by spraying, it is essential to maintain the viscosity in a range which is suitable for spraying. The polyisocyanate emulsions are applied to the fibers in an amount sufficient to provide about 1 to 20, preferably 2 to 10 weight percent of polyisocyanate solids, based on the weight of the fibers.

In accordance with the present invention, it is also possible to incorporate additives into the polyisocyanate emulsions. The additives may be present in the form of a solution or in the form of an emulsion or dispersion. These additives are known and include catalysts such as tertiary amines, silaamines having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The invention is further illustrated but is not intended to be limited by the following examples in which all parts and percentages are by weight unless otherwise specified.

EXAMPLES

Example 1

A modified polyisocyanate was prepared from the following charge:

| Grams | Charge |
| --- | --- |
| 1365.67 | Crude MDI* |
| 682.84 | Monofunctional Polyether** |

*An aniline/formaldehyde condensation product containing 4,4'-diphenylmethane diisocyante and about 50% of higher functionality homologs, having an NCO content of about 31.5% and a viscosity of 25° C. of 200 mPa · s.
**A polyether monohydric alcohol having a MW of 2145 and prepared from n-butanol, ethylene oxide and propylene oxide (in a molar ratio ethylene oxide to propylene oxide of 83:17).

The Crude MDI was charged at ambient temperature into a 1 gallon, 3-neck flask equipped with a thermometer, condenser and stirrer with a 3 inch blade. The Crude MDI was heated to 50° C. while stirring. The monofunctional polyether was added over a time period so that the temperature did not exceed 80° C. After the addition was completed, stirring was maintained for 2 hours at 80° C. under an atmosphere of nitrogen to form a modified polyisocyanate having an NCO content of 20.48% (theoretical NCO=20.68%). The modified polyisocyanate was cooled to ambient temperature.

An aqueous polyurethane dispersion was prepared from the following charge:

| Grams | Charge |
| --- | --- |
| 58.14 | Modified Polyisocyanate |
| 646.77 | Demineralized water |
| 13.72 | Monoethanolamine |

A 2 liter resin flask was charged with 646.77 gms of demineralized water. While rapidly stirring the water at ambient temperature, 58.14 gms of the modified polyisocyanate was added at ambient temperature in less than 1 min. This was immediately followed by the rapid addition of 13.72 gms of monoethanolamine (NH:NCO equivalent ratio=0.8). The off-white dispersion, which had a solids content of 10%, was stirred for 5 min. and a pH of 7.0 was measured. One portion of the dispersion was analyzed for NCO content and another portion was used for drawing a film (10 mil thickness) onto a clean, dry glass plate. The NCO content was found to be 0.24% (2.4%, based on solids).

The film was cured in an oven at 110° C. for 30 min and then cooled to ambient temperature. Adhesion of the film to glass was excellent as determined by ASTM D-3359.

Example 2

A modified polyisocyanate was prepared as described in Example 1. The NCO content of the modified polyisocyanate was 19.99%.

An aqueous polyurethane dispersion was prepared from the following charge:

| Grams | Charge |
| --- | --- |
| 70.00 | Modified Polyisocyanate |
| 810.18 | Demineralized water |
| 20.02 | 1-amino-2-propanol |

A 2 liter resin flask was charged with 810.18 gms of demineralized water. While rapidly stirring the water at ambient temperature, 70.00 gms of the above prepolymer, also at ambient temperature, was added in less than 1 min. This was immediately followed by the rapid addition of 20.02 gms of 1-amino-2-propanol (NH:NCO equivalent ratio=0.8). The dispersion, which had a solids content of 10%, was stirred for 6 min and a pH of 6.5 was measured. One portion of the dispersion was analyzed for NCO content while another portion was used to draw a film (10 mil thickness) onto a clean, dry glass plate. The NCO content was found to be 0.25% (2.5%, based on solids).

The film was cured in an oven at 110° C. for 30 min and then cooled to ambient temperature. The film showed excellent adhesion to glass as measured by ASTM D-3359.

Example 3

Using the modified polyisocyanate prepared in Example 2, an aqueous polyurethane dispersion was prepared according to the following charge:

| Grams | Charge |
| --- | --- |
| 70.00 | Polyisocyanate |
| 810.18 | Demineralized water |
| 20.02 | 3-amino-1-propanol |

A 2 liter resin flask was charged with 810.18 gms of demineralized water. While rapidly stirring the water at ambient temperature, 70.00 gms of the modified polyisocyanate was added in less than 1 min. This was immediately followed by the addition of the entire amount of 20.02 gms of 3-amino-1-propanol (NH:NCO equivalent ratio=0.8). The white dispersion, which had a solids content of 10%, was stirred for 25 min. at which time its pH was 7.0. One portion of the dispersion was analyzed for NCO content and another portion was used for drawing a film (10 mil thickness) onto a clean, dry glass plate. The NCO content was found to be 0.17% (1.7%, based on solids).

The film was cured in an oven at 110° C. for 30 min. and then cooled to ambient temperature. The film showed excellent adhesion to glass as determined by ASTM D-3359 where a rating of 5B (excellent) was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous polyisocyanate dispersion which has an isocyanate content of at least 0.5% by weight, based on the weight of the polyisocyanate, and is prepared by a process which comprises
   a) dispersing in water a polyisocyanate which has an isocyanate content of at least 12% by weight and is rendered hydrophilic by reaction with a compound containing a lateral or terminal nonionic hydrophilic group and b) chain extending the dispersed polyisocyanate with a primary or secondary monoamine containing at least one hydroxyl group in an amount sufficient to provide an equivalent ratio of amino groups to isocyanate groups of 0.6:1.0 to 0.95:1.0.

2. An aqueous polyisocyanate dispersion which has a functionality of at least 2 and an isocyanate content of at least 0.5% by weight, based on the weight of the polyisocyanate, and is prepared by a process which comprises a) dispersing in water an aromatic polyisocyanate which has an isocyanate content of at least 12% by weight and is rendered hydrophilic by reaction with a compound containing a lateral or terminal nonionic hydrophilic group, b) chain extending the dispersed polyisocyanate with a primary or secondary monoamine containing at least one hydroxyl group in an amount sufficient to provide an equivalent ratio of amino groups to isocyanate groups of 0.6:1.0 to 0.95:1.0.

3. The aqueous polyisocyanate dispersion of of claim 2 wherein said primary or secondary monoamine corresponds to the formula

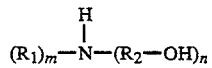

wherein
$R_1$ represents hydrogen or an alkyl, cycloalkyl, araliphatic or aromatic group having up to 15 carbon atoms,
$R_2$ is an optionally branched alkylene group containing 1 to 12 carbon atoms,
m represents 0 or 1,
n represents 1 or 2 and
$m+n=2$.

4. The aqueous polyisocyanate dispersion of claim 3 wherein
$R_1$ is an alkyl group containing 1 to 6 carbon atoms and
$R_2$ is an optionally branched alkylene group containing 1 to 4 carbon atoms.

* * * * *